United States Patent
Masubuchi

(10) Patent No.: US 8,943,810 B2
(45) Date of Patent: Feb. 3, 2015

(54) EXHAUST GAS PURIFICATION SYSTEM FOR AN INTERNAL COMBUSTION ENGINE

(75) Inventor: Masahiko Masubuchi, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 8 days.

(21) Appl. No.: 13/879,201

(22) PCT Filed: Dec. 7, 2010

(86) PCT No.: PCT/JP2010/071932
§ 371 (c)(1),
(2), (4) Date: Apr. 12, 2013

(87) PCT Pub. No.: WO2012/077189
PCT Pub. Date: Jun. 14, 2012

(65) Prior Publication Data
US 2013/0247546 A1  Sep. 26, 2013

(51) Int. Cl.
| | |
|---|---|
| *F01N 3/00* | (2006.01) |
| *F01N 3/20* | (2006.01) |
| *F01N 3/10* | (2006.01) |
| *F01N 9/00* | (2006.01) |
| *F01N 11/00* | (2006.01) |
| *F01N 3/025* | (2006.01) |

(Continued)

(52) U.S. Cl.
CPC *F01N 3/20* (2013.01); *F01N 3/103* (2013.01); *F01N 3/2033* (2013.01); *F01N 9/002* (2013.01); *F01N 11/005* (2013.01); *F01N 3/0253* (2013.01); *F02D 19/0647* (2013.01); *F01N 13/0097* (2013.01); *F02M 43/00* (2013.01); *F01N 2610/03* (2013.01); *F01N 2900/1602* (2013.01); *F01N 2900/1631* (2013.01); *F02D 19/0692* (2013.01); *Y02T 10/26* (2013.01);

(Continued)

(58) Field of Classification Search
CPC ............ F02D 19/0647; F02D 19/0692; F01N 13/0097; F01N 3/103; F01N 3/2033; F01N 9/002; F01N 11/005; F01N 3/0253; F01N 3/20; F01N 2610/03; F01N 2900/1602; F01N 2900/1631; F01N 3/0842; F01N 3/035; F02M 43/00; Y02T 10/26; Y02T 10/47
USPC ................................................. 60/274–324
See application file for complete search history.

(56) References Cited

U.S. PATENT DOCUMENTS

| | | | |
|---|---|---|---|
| 8,418,444 B2 * | 4/2013 | Ikeda et al. ............... | 60/295 |
| 8,635,852 B2 * | 1/2014 | Lupescu et al. ............ | 60/278 |

(Continued)

FOREIGN PATENT DOCUMENTS

| | | |
|---|---|---|
| JP | A-08-158980 | 6/1996 |
| JP | A-2007-162578 | 6/2007 |
| JP | A-2010-156294 | 7/2010 |

*Primary Examiner* — Jesse Bogue
(74) *Attorney, Agent, or Firm* — Oliff PLC

(57) ABSTRACT

The present invention is intended to suppress, in an exhaust gas purification system for an internal combustion engine capable of mixing and combusting liquid fuel and compressed natural gas, an excessive rise in temperature of an exhaust gas purification device at the time when the exhaust gas purification device is caused to regenerate. In the exhaust gas purification system for an internal combustion engine according to the present invention, when the liquid fuel and the compressed natural gas are caused to mix and combust in the internal combustion engine at the time of regenerating the exhaust gas purification device, an amount of HC to be supplied to the exhaust gas purification device from an HC supply device is decreased in comparison with the time when only the liquid fuel is caused to combust in the internal combustion engine.

2 Claims, 3 Drawing Sheets

(51) Int. Cl.
*F02D 19/06* (2006.01)
*F01N 13/00* (2010.01)
*F02M 43/00* (2006.01)
*F01N 3/08* (2006.01)
*F01N 3/035* (2006.01)

(52) U.S. Cl.
CPC .............. *Y02T10/47* (2013.01); *F01N 3/0842* (2013.01); *F01N 3/035* (2013.01)
USPC ................................. 60/295; 60/286; 60/299

(56) References Cited

U.S. PATENT DOCUMENTS

2006/0283173 A1* 12/2006 Zheng et al. .................... 60/274
2009/0165444 A1  7/2009 Oosumi

* cited by examiner

EXHAUST GAS PURIFICATION SYSTEM FOR AN INTERNAL COMBUSTION ENGINE

TECHNICAL FIELD

The present invention relates to an exhaust gas purification system for an internal combustion engine capable of mixing and combusting liquid fuel and compressed natural gas.

BACKGROUND ART

There have been developed internal combustion engines which are capable of mixing and combusting liquid fuel such as light oil, gasoline, etc., and compressed natural gas (hereinafter also referred to as CNG). For example, in Patent Document 1, there is disclosed an auxiliary fuel ignition type gas engine which uses light oil as auxiliary fuel. In this auxiliary fuel ignition type gas engine, mixed combustion of light oil and natural gas is carried out using the light oil as an ignition source. In addition, in Patent Document 1, there is described a technique in which at the time of light load, only light oil is supplied to the internal combustion engine, and at the time of medium load and high load, light oil and natural gas are supplied to the internal combustion engine.

In Patent Document 2, there is disclosed a fuel injection control device which controls fuel injection into cylinders of an internal combustion engine. This fuel injection control device is provided with a reducing agent supply unit that supplies a reducing agent to an exhaust gas purification device. This reducing agent supply unit supplies the reducing agent to the exhaust gas purification device by performing, after main fuel injection, post injection as well as before-post injection small amount injection (pre injection) which is carried out before the post injection and which is smaller in the amount of injection than the post injection, by means of fuel injectors which serve to inject fuel into the cylinders, respectively.

In Patent Document 3, there is disclosed that two or more of an oxygen concentration, a CO concentration and an HC concentration, of an exhaust gas are used as control parameters at the time when a reducing agent is supplied into an exhaust gas flowing into an exhaust gas purification device.

PRIOR ART DOCUMENTS

Patent Documents

Patent Document 1: Japanese patent application laid-open No. H08-158980
Patent Document 2: Japanese patent application laid-open No. 2010-156294
Patent Document 3: Japanese patent application laid-open No. 2007-162578

SUMMARY OF THE INVENTION

Problems to be Solved by the Invention

The exhaust gas purification device having an oxidation function is arranged in an exhaust passage of an internal combustion engine. Then, when the temperature of the exhaust gas purification device is raised so as to regenerate the exhaust gas purification device, HC may be supplied to the exhaust gas purification device by means of an HC supply device. When HC is supplied to the exhaust gas purification device, the temperature of the exhaust gas purification device will go up due to the heat of oxidation or combustion generated by the oxidation of this HC.

Here, methane, which is the main component of CNG, has low ignitability and does not burn or combust easily. For that reason, in cases where liquid fuel and CNG are caused to mix and combust in the internal combustion engine, an amount of HC in the exhaust gas increases to a large extent in comparison with the case where only liquid fuel is combusted. Accordingly, when liquid fuel and CNG are caused to mix and combust in the internal combustion engine, if HC is supplied to the exhaust gas purification device by means of the HC supply device, as in the case where only liquid fuel is caused to combust, there will be a fear that a total amount of HC supplied to the exhaust gas purification device may increase to an excessive extent, resulting in an excessive temperature rise of the exhaust gas purification device.

The present invention has been made in view of the above-mentioned problem, and has for its object to suppress, in an exhaust gas purification system for an internal combustion engine capable of mixing and combusting liquid fuel and CNG, an excessive rise in the temperature of an exhaust gas purification device at the time when the exhaust gas purification device is caused to regenerate.

Means for Solving the Problems

The present invention is featured in that when liquid fuel and compressed natural gas are caused to mix and combust in an internal combustion engine at the time of regenerating an exhaust gas purification device, an amount of HC to be supplied to the exhaust gas purification device from an HC supply device is decreased in comparison with the time when only the liquid fuel is caused to combust in the internal combustion engine.

More specifically, an exhaust gas purification system for an internal combustion engine according to the present invention resides in an exhaust gas purification system for an internal combustion engine in which liquid fuel and compressed natural gas (CNG) can be mixed and combusted, and which comprises:

an exhaust gas purification device that is arranged in an exhaust passage of the internal combustion engine and has an oxidation function;

an HC supply device that supplies HC to said exhaust gas purification device at the time of regenerating said exhaust gas purification device; and an HC supply amount control device that, when the liquid fuel and the compressed natural gas are caused to mix and combust in the internal combustion engine at the time of regenerating said exhaust gas purification device, decreases an amount of HC to be supplied to said exhaust gas purification device from said HC supply device in comparison with the time when only the liquid fuel is caused to combust in the internal combustion engine with an operating state thereof being kept the same.

In the present invention, the liquid fuel and the CNG are mixed and combusted, so when an amount of HC emitted from the internal combustion engine is large, the amount of HC supplied from the HC supply device is decreased so as to regenerate the exhaust gas purification device. For that reason, a total amount of HC supplied to the exhaust gas purification device (=the amount of HC emitted from the internal combustion engine the amount of HC supplied from the HC supply device) is suppressed from becoming large to an excessive extent.

As a result, it is possible to suppress an excessive rise in the temperature of the exhaust gas purification device. In addition, it is also possible to decrease an amount of HC released to the outside without being oxidized in the exhaust gas purification device at the time of regenerating the exhaust gas purification device.

In the present invention, the HC supply amount control device may comprise a first HC emission amount calculation part that calculates a first amount of HC emission which is an amount of HC emitted from the internal combustion engine during the time when only the liquid fuel is caused to combust in the internal combustion engine, and a second HC emission amount calculation part that calculates a second amount of HC emission which is an amount of HC emitted from the internal combustion engine during the time when the liquid fuel and the CNG are caused to mix and combust in the internal combustion engine.

In cases where only the liquid fuel is caused to combust in the internal combustion engine, said first amount of HC emission can be calculated based on the operating state of the internal combustion engine. Also, in cases where the liquid fuel and CNG are caused to mix and combust in the internal combustion engine, the ratio between an amount of supply of the liquid fuel and an amount of supply of the CNG is set based on the operating state of the internal combustion engine. Then, said second amount of HC emission can be calculated based on the operating state of the internal combustion engine and the ratio between the amount of supply of the liquid fuel and the amount of supply of the CNG.

In the above case, when the liquid fuel and the CNG are caused to mix and combust in the internal combustion engine at the time of regenerating the exhaust gas purification device, the amount of HC to be supplied to the exhaust gas purification device from the HC supply device may be decreased by an amount of difference between said first amount of HC emission and said second amount of HC emission, in comparison with the time when only the liquid fuel is caused to combust in the internal combustion engine with the operating state thereof being kept the same. According to this, the exhaust gas purification device can be regenerated to a sufficient extent, while suppressing an excessive rise in the temperature of the exhaust gas purification device as well as the release of HC to the outside Advantageous Effect of the Invention According to the present invention, it is possible to suppress, in an exhaust gas purification system for an internal combustion engine capable of mixing and combusting liquid fuel and CNG, an excessive rise in the temperature of an exhaust gas purification device at the time when the exhaust gas purification device is caused to regenerate.

EMBODIMENTS FOR CARRYING OUT THE INVENTION

Hereinafter, a specific embodiment of the present invention will be described based on the attached drawings. However, the dimensions, materials, shapes, relative arrangements and so on of component parts described in this embodiment are not intended to limit the technical scope of the present invention to these alone in particular as long as there are no specific statements.

First Embodiment

Schematic Construction

Figure 1:
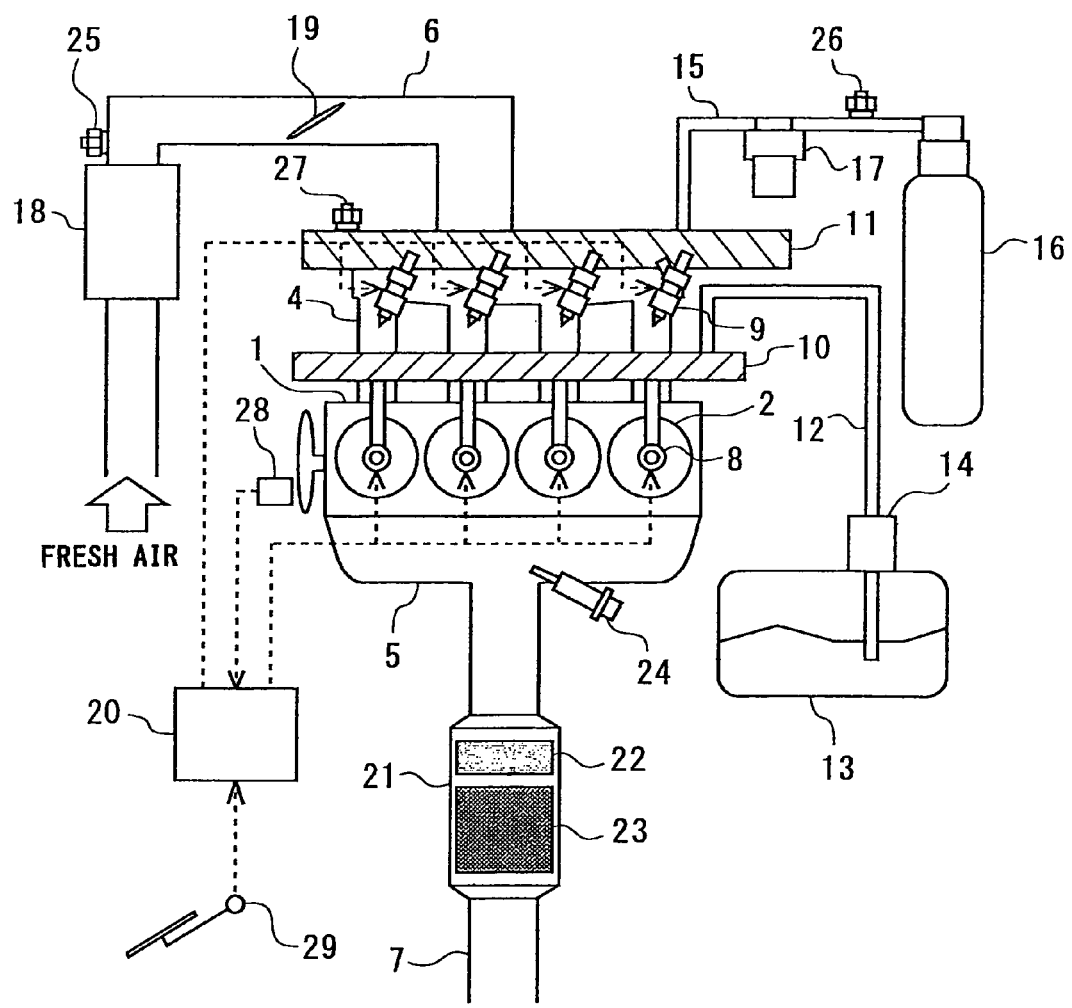
FIG. 1 is a view showing the schematic construction of an internal combustion engine as well as its fuel system and its intake and exhaust systems according to an embodiment of the present invention?

FIG. 1 is a view showing the schematic construction of an internal combustion engine as well as its fuel system and its intake and exhaust systems according to an embodiment of the present invention. The internal combustion engine 1 is an engine for driving a vehicle, which is capable of using light oil and CNG as fuel. The internal combustion engine 1 is a compressing-ignition internal combustion engine. The internal combustion engine 1 can be operated by causing light oil and CNG to combust in a mixed manner, or can also be operated by causing only light oil to combust.

The internal combustion engine 1 has four cylinders 2. Each of the cylinders 2 is provided with a light oil injector 8 that directly injects light oil into a corresponding cylinder 2. In addition, an intake manifold 4 and an exhaust manifold 5 are connected to the internal combustion engine 1. An intake passage 6 is connected to the intake manifold 4. An exhaust passage 7 is connected to the exhaust manifold 5. The intake manifold 4 has four branch pipes connected with the individual cylinders 2, respectively. A CNG injector 9 for injecting CNG is arranged in each of the branch pipes.

The individual light oil injectors 8 are connected to the light oil common rail 10. A light oil supply passage 12 has one end thereof connected to the light oil common rail 10. The light oil supply passage 12 has the other end thereof connected to a light oil tank 13. A pump 14 is arranged in the light oil supply passage 12. Light oil is pressure fed from the light oil tank 13 to the light oil common rail 10 through the light oil supply passage 12 by means of the pump 14. Then, the light oil pressurized in the light oil common rail 10 is supplied to the light oil injectors 8, respectively.

The individual CNG injectors 9 are connected to a CNG delivery pipe 11. A CNG supply passage 15 has one end thereof connected to the CNG delivery pipe 11. The CNG supply passage 15 has the other end thereof connected to a CNG tank 16. CNG is supplied from the CNG tank 16 to the CNG delivery pipe 11 through the CNG supply passage 15. Then, CNG is supplied from the CNG delivery pipe 11 to the individual CNG injectors 9, respectively.

A regulator 17 is arranged in the CNG supply passage 15. The pressure of the CNG supplied to the CNG delivery pipe 11 is regulated by the regulator 17. Pressure sensors 26, 27 for detecting the pressure of CNG are arranged in the CNG supply passage 15 at the upstream side of the regulator 17 and in the CNG delivery pipe 11, respectively.

In cases where the internal combustion engine 1 is operated by carrying out mixed combustion of light oil and CNG, a pre-mixture of intake air and CNG is formed by the CNG being injected into an intake port of each cylinder from a corresponding CNG injector 9. Then, the light oil and the CNG are combusted with the light oil being injected into the cylinders 2 from the light oil injectors 8 to become ignition sources.

In the intake passage 6, there are arranged an air cleaner 18, an air flow meter 25 and a throttle valve 19 sequentially in this order from an upstream side along the flow of fresh air. A light oil addition valve 24, which serves to add or inject light oil into the exhaust gas, is arranged in the exhaust manifold 5. An exhaust gas purification device 21 is arranged in the exhaust passage 7.

The exhaust gas purification device 21 is composed of an oxidation catalyst 22 that is arranged at an upstream side, and a particulate filter (hereinafter referred to simply as a filter) 23 that is arranged at a downstream side. The filter 23 traps particulate matter (hereinafter referred to as PM) in the exhaust gas. In addition, an NOx storage reduction catalyst is supported on the filter 23.

An electronic control unit (ECU) 20 is provided in combination with the internal combustion engine 1. The air flow meter 25 and the pressure sensors 26, 27 are electrically connected to the ECU 20. Moreover, a crank angle sensor 28 and an accelerator opening sensor 29 are electrically connected to the ECU 20. The crank angle sensor 28 detects the crank angle of the internal combustion engine 1. The accelerator opening sensor 29 detects the degree of opening of an accelerator of a vehicle on which the internal combustion engine 1 is mounted. The output signals of the individual sensors are inputted to the ECU 20. The ECU 20 calculates the engine rotational speed of the internal combustion engine 1 based on the output signal of the crank angle sensor 28, and also calculates the engine load of the internal combustion engine 1 based on the output signal of the accelerator opening sensor 29.

In addition, the light oil injectors 8, the CNG injectors 9, the pump 14, the regulator 17, the throttle valve 19, and the light oil addition valve 24 are electrically connected to the ECU 20. Thus, these parts are controlled by the ECU 20.

The ECU 20 selects, as its combustion mode, either one of the mixed (or premixed) combustion of light oil and CNG, and the combustion of only light oil, based on an operating state of the internal combustion engine 1. Then, the ECU 20 controls the light oil injectors 8 and the CNG injectors 9 according to the selected combustion mode.

[Filter Regeneration Processing]

In this embodiment, filter regeneration processing, which serves to remove the particulate matter deposited on the filter 23 thereby to regenerate the filter 23, is carried out. The filter regeneration processing according to this embodiment is achieved by adding light oil into the exhaust gas from the light oil addition valve 24.

When HC is supplied to the exhaust gas purification device 21 by light oil being added into the exhaust gas from the light oil addition valve 24, this HC is oxidized in the oxidation catalyst 22 and the NOx storage reduction catalyst supported on the filter 23. As the temperature of the filter 23 goes up, due to the heat of oxidation, to a target temperature at which particulate matter can be oxidized, the particulate matter deposited on the filter 23 is removed.

Hereinafter, reference will be made to a flow of the filter regeneration processing according to this embodiment, based on a flow chart shown in FIG. 2. This flow is beforehand stored in the ECU 20, and is executed by the ECU 20.

In this flow, first, it is determined whether an execution start condition for the filter regeneration processing has been satisfied (step S101). As the execution start condition for the filter regeneration processing, there can be exemplified that an estimated value of the amount of PM deposition in the filter 23 has become equal to or more than a predetermined value, or that a predetermined time has elapsed after the last execution of the filter regeneration processing was completed, etc.

The temperature of the filter 23 at the time of the execution of the filter regeneration processing is controlled by controlling an amount of light oil to be added from the light oil addition valve 24 (i.e., by controlling an amount of HC to be supplied to the exhaust gas purification device 21). Accordingly, in cases where the execution start condition for the filter regeneration processing is satisfied, a target amount of light oil Qaddt to be added from the light oil addition valve 24 is calculated (step S102). A specific calculation method for this target light oil addition amount Qaddt will be described later.

After that, an amount of light oil Qadd to be added from the light oil addition valve 24 is set to the target light oil addition amount Qaddt (step S103). Then, the addition of light oil from the light oil addition valve 24 is carried out (step S104), and the execution of the filter regeneration processing is started with this.

[Calculation Method of the Light Oil Addition Amount]

Next, reference will be made to a calculation method for the target amount of light oil to be added from the light oil addition valve 24 at the time of the execution of the filter regeneration processing according to this embodiment. HC is generated due to the fact that the light oil or CNG is not combusted completely but remains uncombusted in the cylinders 2 of the internal combustion engine 1. For that reason, HC is contained in the exhaust gas discharged from the internal combustion engine 1.

Accordingly, even in a state where light oil is not added from the light oil addition valve 24, HC emitted from the internal combustion engine 1 is supplied to the exhaust gas purification device 21. The HC is oxidized in the oxidation catalyst 22 or in the NOx storage reduction catalyst supported on the filter 23, similar to the HC which has been supplied by light oil being added from the light oil addition valve 24. Then, due to the heat of the oxidation, the temperature of the filter 23 is caused to go up.

For that reason, in order to control the temperature of the filter 23 to its target temperature, it is necessary to take into consideration not only the amount of HC supplied by light oil being added from the light oil addition valve 24 but also the amount of HC emitted from the internal combustion engine 1. Accordingly, at the time of adding light oil from the light oil addition valve 24, the amount of HC emitted from the internal combustion engine 1 is estimated. Then, an amount of light oil corresponding to an amount of HC, which is short with respect to the amount of HC thus estimated for the purpose of raising the temperature of the filter 23 to its target temperature, is added from the light oil addition valve 24.

The amount of HC emitted from the internal combustion engine 1 can be estimated based on the operating state of the internal combustion engine 1. However, methane ($CH_4$), which is the main component of CNG, does not burn or combust easily in comparison with light oil. For that reason, assuming that the operating state of the internal combustion engine 1 is the same, when light oil and CNG are mixed and combusted in the internal combustion engine 1, the amount of HC emitted from the internal combustion engine 1 increases greatly in comparison with the time when only light oil is combusted in the internal combustion engine 1.

Accordingly, in this embodiment, when light oil and CNG are mixed and combusted in the internal combustion engine 1 at the time of executing the filter regeneration processing, the amount of light oil to be added from the light oil addition valve 24 is decreased in comparison with the time when only light oil is caused to combust in the internal combustion engine 1 in the same operating state thereof.

Figure 2:
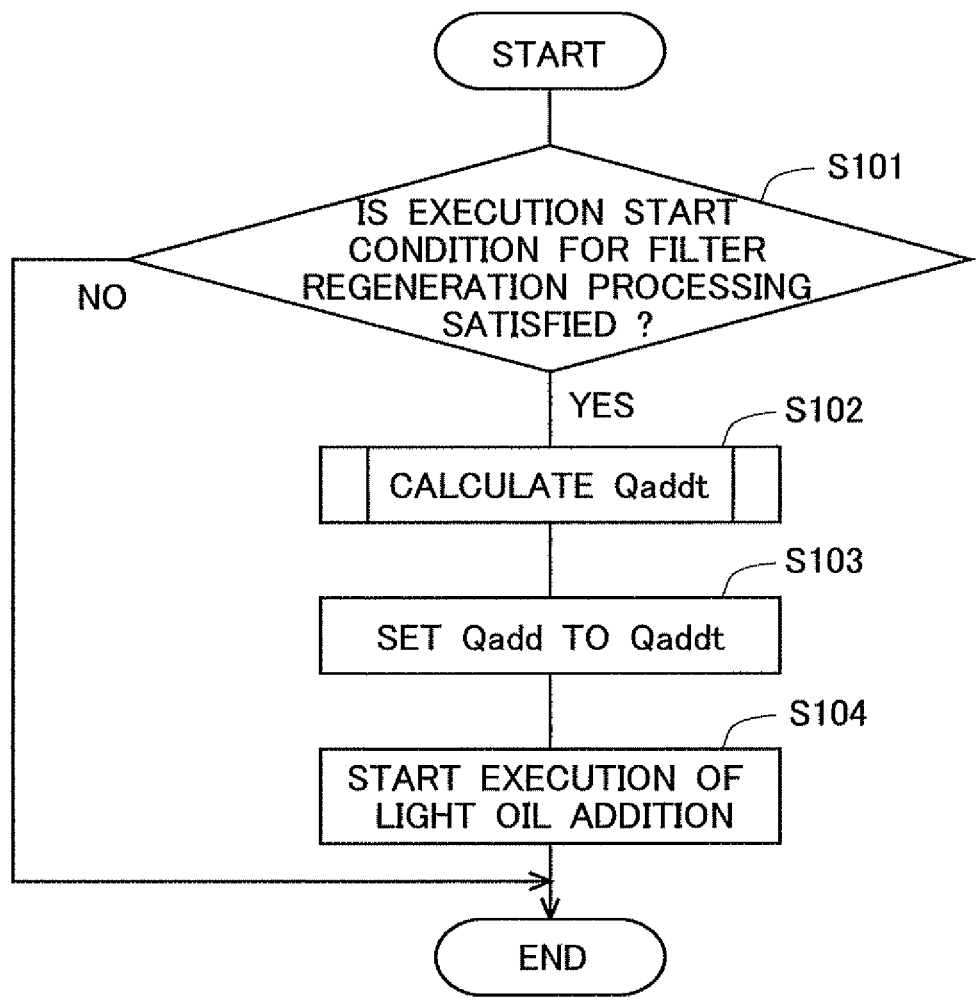
FIG. 2 is a flow chart showing a flow for filter regeneration processing according to the embodiment.
Figure 3:
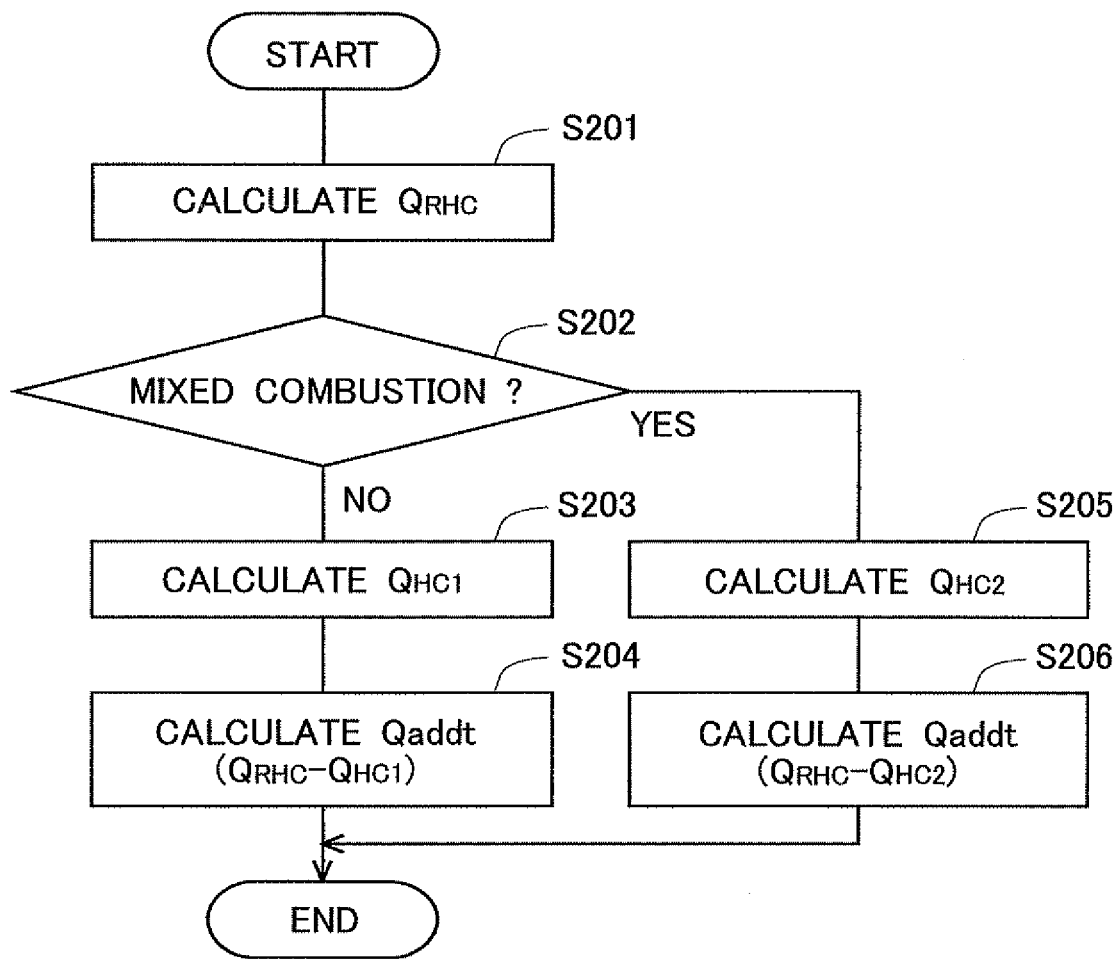
FIG. 3 is a flow chart showing a calculation flow for a target amount of light oil to be added from a light oil addition valve at the time of the execution of the filter regeneration processing according to the embodiment.

FIG. 3 is a flow chart showing a calculation flow for the target amount of light oil to be added from the light oil addition valve 24 at the time of the execution of the filter regeneration processing according to this embodiment. This flow is beforehand stored in the ECU 20, and is carried out in step S102 in the flow shown in FIG. 2.

In this flow, first, a required amount of HC supply $Q_{RHC}$, which is an amount of HC required to be supplied to the exhaust gas purification device 21 so as to raise the temperature of the filter 23 to the target temperature, is calculated (step S201). The required amount of HC supply is calculated based on a difference between the $Q_{RHC}$ temperature of the exhaust gas discharged from the internal combustion engine 1 (i.e., the temperature of the filter 23 when it is assumed that HC is not supplied to the exhaust gas purification device 21), and its target temperature.

The temperature of the exhaust gas discharged from the internal combustion engine 1 can be estimated based on the operating state of the internal combustion engine 1. Also, the temperature of this exhaust gas may be detected by a temperature sensor. The target temperature in the filter regeneration processing is beforehand set based on experiments, etc. The relation between the difference between the temperature of the exhaust gas discharged from the internal combustion engine 1 and its target temperature, and the required amount of HC supply $Q_{RHC}$ can be beforehand obtained based on experiments, etc. Then, such a relation is stored in the ECU 20 as a map or a function. In step S201, the required amount of HC supply $Q_{RHC}$ can be calculated by assigning the difference between the temperature of the exhaust gas discharged from the internal combustion engine 1 and its target temperature to the map or the function.

Subsequently, it is determined whether the internal combustion engine 1 is operated by mixed combustion of light oil and CNG (step S202). Then, in cases where the internal combustion engine 1 is operated by combustion of only light oil, a first amount of HC emission $Q_{HC1}$ is calculated (step S203). On the other hand, in cases where the internal combustion engine 1 is operated by mixed combustion of light oil and CNG, a second amount of HC emission $Q_{HC2}$ is calculated (step S205).

The first amount of HC emission $Q_{HC1}$ is an amount of HC emitted from the internal combustion engine 1 when only light oil is combusted in the internal combustion engine 1. The relation between the operating state of the internal combustion engine 1 and the first amount of HC emission $Q_{HC1}$, which has been obtained through experiments, etc., is stored in the ECU 20 as a map or a function. In step S202, the first amount of HC emission $Q_{HC1}$ is calculated by assigning the operating state of the internal combustion engine 1 to the map or the function.

The second amount of HC emission $Q_{HC2}$ is an amount of HC emitted from the internal combustion engine 1 when light oil and CNG are mixed and combusted in the internal combustion engine 1. In cases where light oil and CNG are mixed and combusted in the internal combustion engine 1, the ratio between the amount of supply of light oil and the amount of supply of CNG is set based on the operating state of the internal combustion engine 1. The relation between the ratio between the amount of supply of light oil and the amount of supply of CNG, and the operating state of the internal combustion engine 1, which has been obtained through experiments, etc., is stored in the ECU 20 as a map or a function. In this map or function, the ratio between the amount of supply of light oil and the amount of supply of CNG with respect to the operating state of the internal combustion engine 1 is set in such a manner that combustion (mixed combustion) inside the cylinders 2 can be ensured while suppressing the amount of supply of light oil as much as possible.

Further, the relation among the operating state of the internal combustion engine 1, the ratio between the amount of supply of light oil and the amount of supply of CNG, and the second amount of HC emission $Q_{HC2}$, which has been obtained through experiments, etc., is stored in the ECU 20 as a map or a function. As stated above, when light oil and CNG are mixed and combusted in the internal combustion engine 1, the amount of HC emitted from the internal combustion engine 1 increases in comparison with the time when only light oil is combusted in the internal combustion engine 1. Accordingly, in this map or function, the second amount of HC emission $Q_{HC2}$ is set to a larger amount in comparison with the first amount of HC emission $Q_{HC1}$ in the case of assuming the operating state of the internal combustion engine 1 to be the same. In step S205, the second amount of HC emission $Q_{HC2}$ is calculated by assigning the operating state of the internal combustion engine 1 and the ratio between the amount of supply of light oil and the amount of supply of CNG to the map or the function.

Then, in cases where the internal combustion engine 1 is operated by combustion of only light oil, the first amount of HC emission $Q_{HC1}$ is subtracted from the required amount of HC supply $Q_{RHC}$ to provide a subtraction value, and a light oil addition amount corresponding to that subtraction value is calculated as the target light oil addition amount Qaddt to be supplied from the light oil addition valve 24 (step S204). On the other hand, in cases where the internal combustion engine 1 is operated by mixed combustion of light oil and CNG, the second amount of HC emission $Q_{HC2}$ is subtracted from the required amount of HC supply $Q_{RHC}$ to provide a subtraction value, and a light oil addition amount corresponding to that subtraction value is calculated as the target light oil addition amount Qaddt to be supplied from the light oil addition valve 24 (step S206).

According to the above calculation method, when liquid fuel and CNG are mixed and combusted in the internal combustion engine 1, the target light oil addition amount Qaddt to be supplied from the light oil addition valve 24 at the time of carrying out the filter regeneration processing is decreased by an amount corresponding to a difference ($=Q_{HC2}-Q_{HC1}$) between the first amount of HC emission $Q_{HC1}$ and the second amount of HC emission $Q_{HC2}$, in comparison with the case where only light oil is combusted in the internal combustion engine 1 to provide the same operating state thereof.

According to this, at the time of the execution of the filter regeneration processing, it is possible to suppress the amount of HC supplied to the exhaust gas purification device 21 from being increased to an excessive extent. As a result, it is possible to suppress an excessive rise in the temperature of the filter 23. Moreover, it is also possible to decrease an amount of HC released to the outside without being oxidized in the oxidation catalyst 22 and in the NOx storage reduction catalyst supported on the filter 23.

In addition, the temperature of the filter 23 can be raised to its target temperature, while obtaining these effects, so the particulate matter deposited on the filter 23 can be removed. In other words, the filter 23 can be regenerated to a sufficient extent. Further, the amount of consumption of light oil in accordance with the execution of the filter regeneration processing can be suppressed.

Here, note that in the foregoing description, at the time of regulating the amount of HC to be supplied to the exhaust gas purification device 21, the amount of light oil to be added from the light oil addition valve 24 is caused to increase or decrease. However, in cases where light oil is added from the light oil addition valve 24 at a plurality of times, the amount of HC to be supplied to the exhaust gas purification device 21 may be regulated by changing the execution interval of the addition of light oil without changing the amount of light oil to be added from the light oil addition valve 24 itself in each time. For example, if the interval of execution of the addition of light oil from the light oil addition valve 24 is made longer (i.e., if the stop period of the addition of light oil is made longer), the amount of HC supplied to the exhaust gas purification device 21 per unit time can be decreased In addition, the control on the amount of light oil to be added from the light oil addition valve according to this embodiment can be applied not only to filter regeneration processing but also to other processing accompanied by the addition of light oil from the light oil addition valve 24. For example, in SOx reduction processing to reduce the SOx stored in the NOx storage reduction catalyst supported on the filter 23, it is necessary to raise the temperature of the filter 23 (i.e., the temperature of the NOx storage reduction catalyst) to a temperature at which SOx can be reduced, by adding light oil from the light oil addition valve 24. The control on the amount of light oil to be added from the light oil addition valve according to this embodiment can also be applied to such SOx reduction processing.

In this embodiment, the exhaust gas purification device 21 corresponds to an exhaust gas purification device according to the present invention. However, the construction of the exhaust gas purification device according to the present invention is not limited to the construction of the exhaust gas purification device 21 or the like. The exhaust gas purification device according to the present invention has an oxidation function, but may be of any construction as long as it is regenerated by HC being supplied thereto.

Also, in this embodiment, the light oil addition valve 24 corresponds to an HC supply device according to the present invention. However, in this embodiment, in place of the addition of light oil from the light oil addition valve 24, HC can also be supplied to the exhaust gas purification device 21 by carrying out auxiliary injection by means of each light oil injector 8 at a timing after main injection. In this case, the amount of auxiliary injection by each light oil injector 8 is controlled in the same manner as in the case of the amount of light oil added from the light oil addition valve 24. In addition, in this case, the light oil injectors 8 to carry out auxiliary injection correspond to the HC supply device according to the present invention.

In addition, in this embodiment, light oil corresponds to liquid fuel according to the present invention. However, the liquid fuel according to the present invention is not limited to light oil. The present invention can also be applied to internal combustion engines in which gasoline, alcohol or LPG, and CNG can be mixed and combusted. In this case, gasoline, alcohol or LPG corresponds to the liquid fuel according to the present invention.

Moreover, in this embodiment, the ECU 20, which carries out the processing of steps S102 and S103 in the flow shown in FIG. 2 as well as the flow shown in FIG. 3, corresponds to an HC supply amount control device according to the present invention. Further, in this embodiment, the ECU 20, which carries out the processing of step S203 in the flow shown in FIG. 3, corresponds to a first HC emission amount calculation part according to the present invention. Also, in this embodiment, the ECU 20, which carries out the processing of step S205 in the flow shown in FIG. 3, corresponds to a second HC emission amount calculation part according to the present invention.

DESCRIPTION OF THE REFERENCE SIGNS

1 . . . internal combustion engine
2 . . . cylinders
8 . . . light oil injectors
9 . . . CNG injectors
20 . . . ECU
21 . . . exhaust gas purification device
22 . . . oxidation catalyst
23 . . . particulate filter
24 . . . light oil addition valve
28 . . . crank angle sensor
29 . . . accelerator opening sensor

The invention claimed is:

1. An exhaust gas purification system for an internal combustion engine in which liquid fuel and compressed natural gas can be mixed and combusted, said system comprising:
   an exhaust gas purification device that is arranged in an exhaust passage of the internal combustion engine and has an oxidation function;
   an HC injector configured to supply HC to said exhaust gas purification device at the time of regenerating said exhaust gas purification device; and
   an electronic control unit configured to control the HC injector such that, when the liquid fuel and the compressed natural gas are caused to mix and combust in the internal combustion engine at the time of regenerating said exhaust gas purification device, an amount of HC to be supplied to said exhaust gas purification device from said HC injector is decreased in comparison with a time when only the liquid fuel is caused to combust in the internal combustion engine with an operating state thereof being kept the same.

2. The exhaust gas purification system for an internal combustion engine as set forth in claim 1, wherein said electronic control unit is further configured to:
   calculate a first amount of HC emission which is an amount of HC emitted from the internal combustion engine during the time when only the liquid fuel is caused to combust in the internal combustion engine; and
   calculate a second amount of HC emission which is an amount of HC emitted from the internal combustion engine during the time when the liquid fuel and the compressed natural gas are caused to mix and combust in the internal combustion engine; and
   wherein when the liquid fuel and the compressed natural gas are caused to mix and combust in the internal combustion engine at the time of regenerating said exhaust gas purification device, the amount of HC to be supplied to said exhaust gas purification device from said HC injector is decreased by an amount of difference between said first amount of HC emission and said second amount of HC emission, in comparison with the time when only the liquid fuel is caused to combust in the internal combustion engine with the operating state thereof being kept the same.

* * * * *